United States Patent [19]

Wolff

[11] Patent Number: 4,582,105

[45] Date of Patent: Apr. 15, 1986

[54] WORK STAND FOR ELECTRICALLY POWERED MACHINES

[76] Inventor: Robert Wolff, Im Kiesacker 12, 5446 Engeln, Fed. Rep. of Germany

[21] Appl. No.: 626,993

[22] Filed: Jul. 2, 1984

[30] Foreign Application Priority Data

Oct. 29, 1983 [DE] Fed. Rep. of Germany ....... 3339438

[51] Int. Cl.$^4$ .............................................. B27C 3/00
[52] U.S. Cl. ..................................... 144/106; 144/1 F; 408/90; 408/135; 408/172; 408/712
[58] Field of Search ....................... 408/89, 90, 87, 88, 408/135, 136, 236, 237, 712; 144/1 R, 1 E, 1 F, 106

[56] References Cited

U.S. PATENT DOCUMENTS

| | | | |
|---|---|---|---|
| 2,820,377 | 1/1958 | Buck | 408/135 |
| 2,876,663 | 3/1959 | Buck | 408/172 |
| 3,119,286 | 1/1964 | Forman et al. | 144/106 |

FOREIGN PATENT DOCUMENTS

2110924 9/1972 Fed. Rep. of Germany ...... 408/712

*Primary Examiner*—W. D. Bray
*Attorney, Agent, or Firm*—Antonelli, Terry & Wands

[57] ABSTRACT

A work stand for power operated tools such as, for example, an electrically powered hand drill, with the work stand including a supporting bracket adjustable along a guide column, a guide plate pivotable about a horizontal axis at the supporting bracket, a slide displaceable in a prismatic guide of the guideway, and a machine support carried by the slide. The machine support is adapted to be pivoted around the horizontal axis and is steplessly adjustable around both axes up to a full rotational angle so as to accommodate large rotational moments in a fixed condition. The guide plate and the machine support are each provided with a truncated conically-shaped axle journal accommodated in an associated conical pivot bearing respectively provided at the supporting bracket and the slide.

27 Claims, 7 Drawing Figures

WORK STAND FOR ELECTRICALLY POWERED MACHINES

The present invention relates to a work stand and, more particularly, to a work stand for electrically powered machines such as, for example, electrically powered hand drills or milling machines, with the work stand including a height adjustable supporting bracket mounted on a support column, with the supporting bracket carrying a horizontally pivotable guide plate having a prismatic guide means for movably guiding a lifting slide carrying a machine support adapted to be horizontally pivotable around a pivot axis Vertically adjustable double pivoting work stands of the aforementioned type have been proposed which permit a carrying out of a wide range of different working operations. With, for example, an electrically powered hand drill or a milling apparatus, in addition to a usual vertical drilling, it is also possible to carry out horizontal or transverse drilling as well as horizontal transverse or vertical milling operations. Especially during milling operations, considerably large turning moments occur at the two pivot axes, which moments need to be compensated or prevented by the use of a special stable clamping device.

In, for example, German Pat. No. 30 40 651, a work stand is proposed which employs two vertical circular surfaces having opposed teeth adapted to be pressed against each other in order to prevent a rotation around a horizontal axis, with the proposed stand permitting an optional horizontal swinging up to a full rotational position. However, in addition to the proposed teeth, this proposed work stand additionally requires a separate guide bearing for a centering of the pivot axis and, moreover, only a stepwise regulation is possible.

Work stands have also been proposed wherein two circular plane faces are pressed against each other by means of screws or the like running or extending in curved guide slots. With these proposed work stands, continuous movement is possible; however, because of the question of stability, the guide slots or slits can only pivot through about 90°. Consequently, the pivot or swivel angle is very limited. In order to obtain a sufficient clamping pressure, the faces pressed against each other must have a relatively large diameter. Moreover, in the above noted German Patent, a swiveling or pivoting device is proposed wherein, at a central journal or the like the support column is surrounded by two half cylindrical shells adapted to be pressed onto each other by means of screws and then clamped on the journal. With this type of arrangement the continuous pivoting movement is possible up to a full rotation; however, in order to attain sufficient clamping force of the half cylindrical shells, it is necessary for the shells to have a relatively great axial length which, in the case of a work stand provided with two horizontal pivot axes, would result in the work stand being of an extremely large size.

The aim underlying the present invention essentially resides in providing a work stand of the aforementioned type which is steplessly movable around two pivot axes up to a full rotation and which can accommodate large rotational moments in a fixed condition and which is nevertheless relatively small and can be easily manufactured.

In accordance with the present invention, the guide plate and machine support are each provided with a truncated conically shaped axle journal widening toward the outside, with the axle journals being associated with conical pivot bearings respectively disposed at the supporting bracket and the lift slide. The provision of a conical pivot guide enables a stepless angular adjustment. Moreover, with regard to the prevention of rotation of the elements during a working operation, a significant advantage of the present invention resides in the fact that high clamping moments can be achieved through a wedge effect of the conical bearing surfaces which have a relatively small total axial length. Additionally, the conical bearing guide ensures a centering of the pivot axis so that additional centering equipment such as, for example, guide webs or the like are not necessary. Therefore, two pivot devices can be obtained with comparatively small production requirements.

According to the present invention, both the supporting bracket and the lift slide are formed of two housing parts which are adapted to be tightened or drawn together, with each housing part surrounding an axle journal and including half conical shell portions. The housing parts are divided in parallel to a moving direction and parallel to a center axis of the conical pivot bearing. With the supporting bracket and lift slide being formed of two housing parts, the installation of the truncated conically shaped axle journals which increase in an outward direction can be accomplished without any significant problems. A clamping force between the two housing parts makes it possible to vary the backlash of the conical pivot bearings in order to effect a tightening or loosening of the axle journals.

In accordance with further advantageous features of the present invention, the conical shells of the two housing parts can be tightened or loosened at the axle journal during the operation by one or several fixing screws located near the conical shells. By virtue of the arrangement of the fixing screws, the clamping force between the housing parts can easily steplessly be varied, that is, by changing the radial backlash of the conical pivot bearing, the axial journals can be tightened or loosened. Due to the high clamping moments, only a slight adjustment is necessary to achieve a sufficient fixing of the axle journals.

In accordance with the present invention, the axle journal of the machine support may include a coaxial worm gear at a free end thereof cooperable with an adjusting worm disposed in the lift slide. After a loosening, the machine support can be adjusted relative to the lift slide in an easy manner whereby even heavy machines need not be removed during the adjustment. As with worm gears, there is always a certain backlash and, in this case, the axle journal of the machine support must also be fixed during the working process. The adjusting possibilities by a worm gear and adjusting worm is not absolutely necessary as the whole machine support can also be turned by hand to a new desired position after a slight loosening of the fixing means for the axle journal. In accordance with still further features of the present invention, the truncated conically shaped axle journal of the guide plate can be threadably attached at the guide plate by a centrally disposed axially extending bolt or screw, with the bolt or screw being laterally accessible so as to enable a tightening or loosening by a wrench or turning tool or a turning handle. With this arrangement, the axle journal may be tightened or loosened in the pivot bearing during the operation process by adjusting the bolt or screw. Moreover, with this arrangement, the fixing of the axle journals is not achieved by changing the pivot bearing but rather by an axial displacement of the axle journal. An advantage of this construction resides in the fact that, for fixing the axle journal, only one bolt or screw needs to be adjusted and, consequently, this construction renders the work stand especially easy to handle.

Advantageously, in accordance with the present invention, a column of the work stand is placed at a back edge of the base plate so as to provide for two joint woking surfaces, namely, a surface in front of the column and the surface arranged laterally of the column. For this reason, the base plate can be rectangular or substantially square-shaped with the column being eccentrically arranged at a side ratio of about 2:1. Alternatively, the base plate may have an angular configuration with the column disposed at the inner angular edge. A distance between a longitudinal center axis of the column and a center axis of the machine support is advantageously about one half of a lateral length of the base plate. This type of work stand enables not only a carrying out of simple drilling operations but also enables milling of different types to be carried out. By this arrangement, the size of the work stand and the arrangement of the column can be totally adapted to requirements for a favorable treatment of the work piece because the rotational moments which have to be absorbed by the work stand do not need to be taken into consideration.

The base plate may, in accordance with the present invention, be provided with a cast on cylindrical sleeve having a longitudinal slot so as to form clamping jaws in which the column can be rotatably adjusted by turning during an operation of the machine.

The base plate may be provided near the column with one or more holes for accommodating socket keys and with grooves and/or webs for preventing a roll off of the drill or the like from the work stand when removed form the machine support.

The above and other objects, features, and advantages of the present invention will become more apparent from the following description when taken in connection with the accompanying drawings which show, for the purposes of illustration only, one embodiment in accordance with the present invention.

Figure 1:
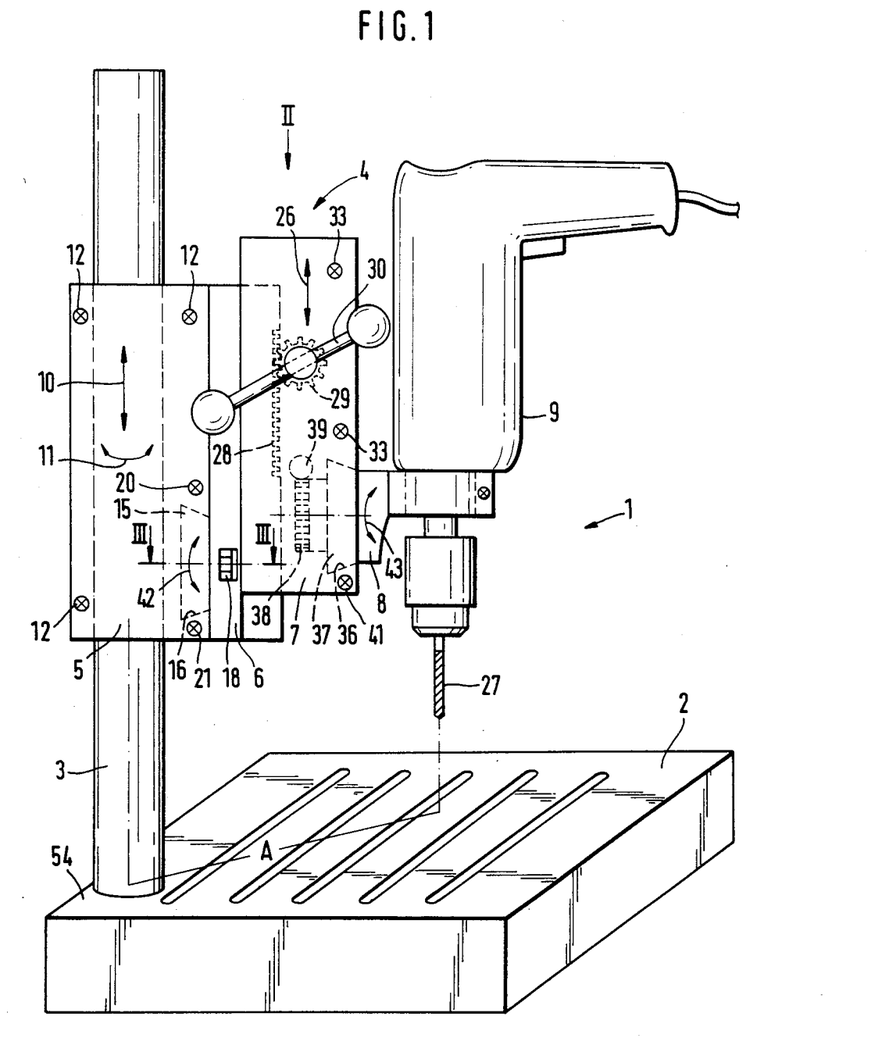
FIG. 1 is a side view of a work stand constructed in accordance with the present invention having an electrically powered hand drill mounted therein.
Figure 2:
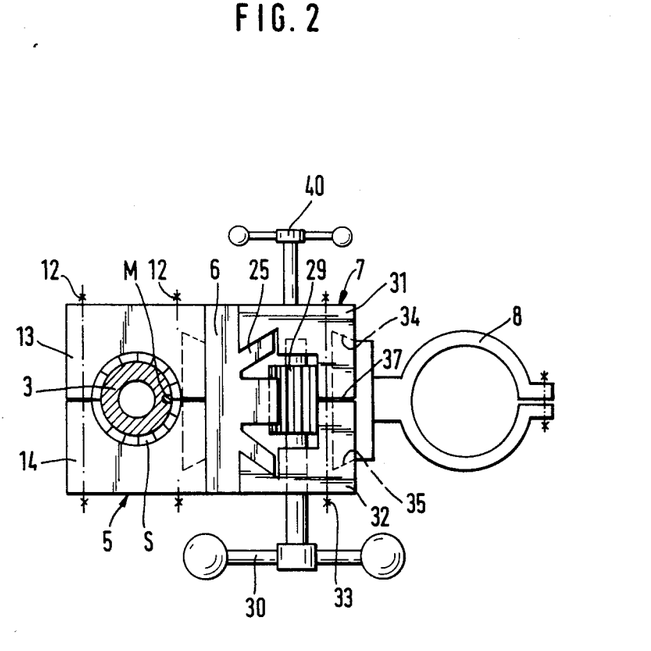
FIG. 2 is a plan view of an adjusting device of the work stand taken in the direction of the arrow II in FIG. 1.

Referring now to the drawings wherein like reference numerals are used throughout the various views to designate like parts and, more particularly, to FIGS. 1 and 2, according to these figures, a work stand generally designated by the reference numeral 1 includes a base plate 2, a column 3, and an adjusting device generally designated by the reference numeral 4, with the adjusting device 4 including a supporting bracket generally designated by the reference numeral 5, a guide plate 6, a lift slide 7 and a machine support 8 which may accommodate, for example, an electrically powered hand drill 9. The supporting bracket 5 can be adjustably reciprocated along the column 3 in a vertical direction designated by the double headed arrow 10 as well as pivoted around the column 3 in the direction of the double headed arrow 11. The supporting bracket 5 includes two housing parts 13, 14 which are secured to the column 3 by fixing screws 12 which draw the housing parts 13, 14 toward each other.

Figure 3:
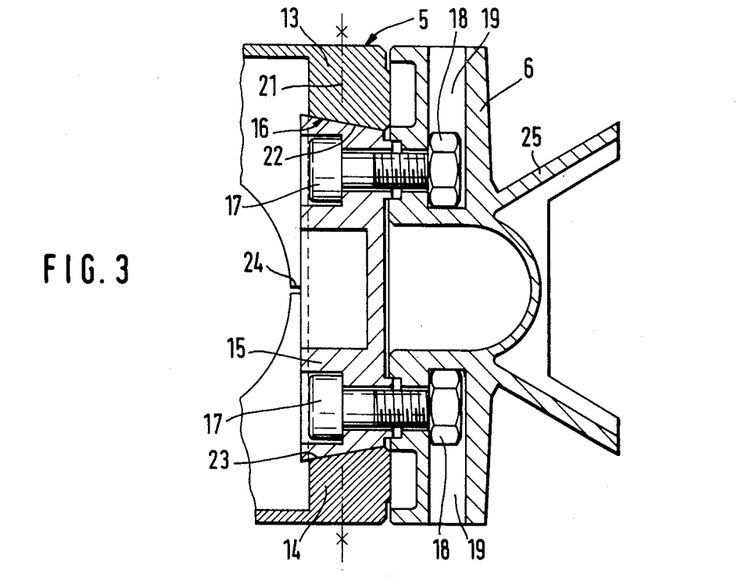
FIG. 3 is a partial cross-sectional view through a supporting bracket and guide plate of the work stand taken along the line III-III in FIG. 1.

As shown most clearly in FIG. 3, the guide plate 6 is provided with a truncated conically shaped axle journal 15 which increases in a direction away from the guide plate 6 and which is accommodated in a pivot bearing 16 at the supporting bracket 5. The axle journal 15 is threadably secured to the guide plate 6 with two bolts or screws 17 and nuts 18, with the nuts being accommodated in guide slots 19 so as to prevent a twisting thereof. By virtue of the fact that the guide plate 6 and the axle journal are formed as separate elements, the manufacturing and installation of these parts is greatly facilitated. With the construction of FIGS. 1-3, the axle journal 15 is fixed in the pivot bearing 16 by a tightening of the fixing screws 20 and 21 and also the housing parts 13, 14 and therewith the conical shell halfs 22, 23 are pressed against each other. By constructing the two housing parts 13, 14 in such a manner that, in an untightened position of the axle journal 15, they join in an area of the fixing screws 20 and are provided with a gap 24 in an area of the fixing screws 21, the axle journal 15 can, with appropriate manufacturing tolerances, be fixed only by adjusting or tightening the fixing screws 21. The guide plate 6 includes a prismatic guide 25 along which the slide 7 can be shifted in the direction of the double headed arrow 26, with the movement of the slide 7 causing advance and retraction of the tool 27. The movement of the slide 7 is controlled by a rack 28 and a pinion 29 as well as by a control lever 30.

As shown in FIGS. 1 and 2, as with the supporting bracket 5, the slide 7 includes two housing parts 31, 32 which are adapted to be pressed toward each other by the fixing screws 33. Each housing part 31, 32 includes half conically shaped shell portions 34, 35 which together form a pivot bearing 36 for a truncated conically shaped axle journal 37 of the machine support 8. The axle journal 37 of the machine support 8 is provided with a coaxial worm gear 38 at a free end thereof which cooperates with an adjusting worm 39 located in the lift slide 7. The adjusting worm 39 is operated by a control lever 40, with the axle journal 37 in the pivot bearing 36 being adjusted by a fixing screw 41.

With the above described arrangement, the whole hand drill 9 can be double pivoted in a vertical plane. More particularly, a rotation around the axle journal 15 in a direction of the double headed arrows 42 is possible which changes the advancing and retraction direction 26, and a turning of the axle journal 37 in a direction of the double headed arrows 43 is possible so as to cause a pivoting of the hand drill 9 relative to the advance and retraction direction 26. Moreover, in addition to the normal position of the hand drill 9 shown in FIG. 1, which is necessary in, for example, a vertical drilling operation, there are a variety of additional positions of the machine 9 which are possible and which can be achieved by adjusting the supporting bracket 5 at the column 3. Consequently, the tool 27 may, especially during milling operations, be brought into positions which can bring about a high load moment on the pivot bearing 16, 36; however, such load moment will definitely be absorbed because of the constructional features of the present invention. In the horizontal plane, the hand drill 9 may be adjusted by rotation around the column 3 and, the facilitate the adjustment, the supporting bracket 5 may be provided with a scale S (FIG. 2) at an upper side thereof cooperable with an indexing notch M.

Figure 4:
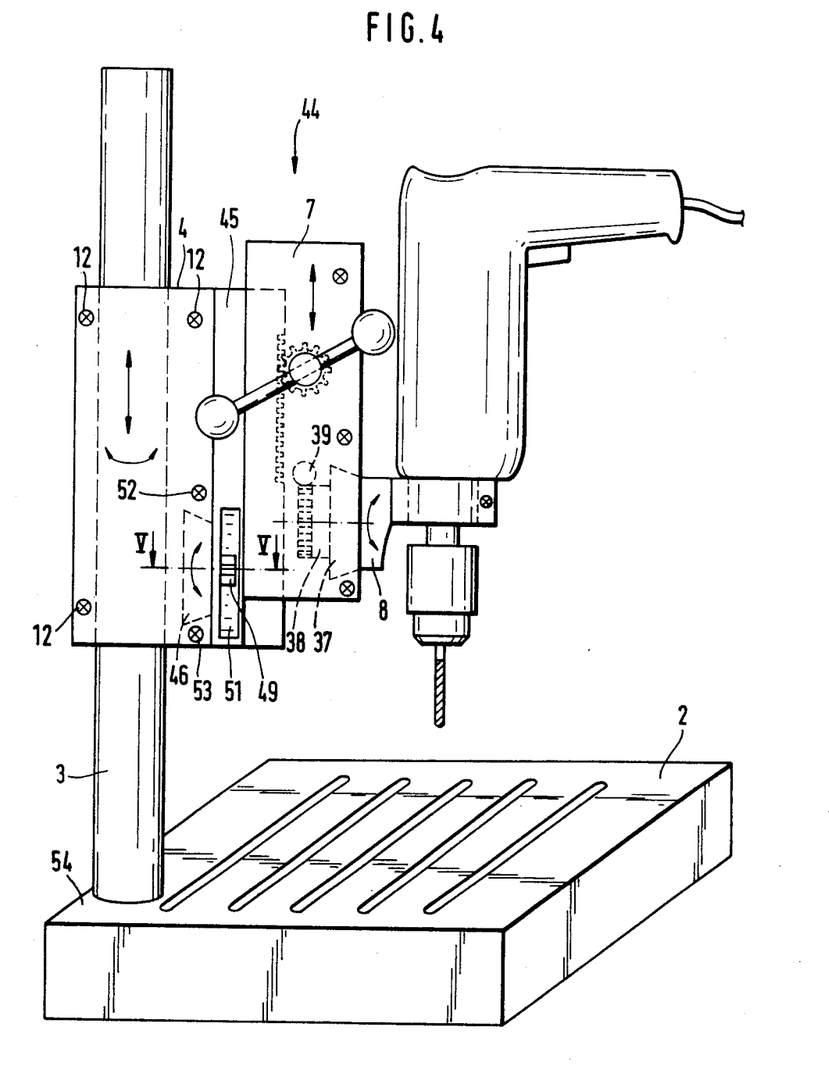
FIG. 4 is a side view of another embodiment of a work stand constructed in accordance with the present invention with an axial threading of the axle journal of the guide plate.
Figure 5:
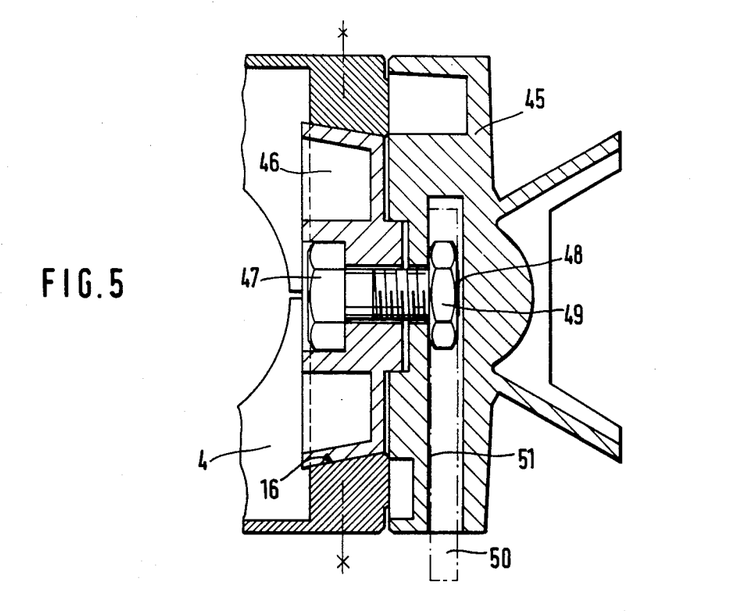
FIG. 5 is a cross-sectional view of a supporting bracket and guide plate of the work stand taken along the line V—V in FIG. 4.

FIGS. 4 and 5 provide an example of another embodiment of a work stand generally designated by the reference numeral 44 in which the base plate 2, the column 3, the supporting bracket 5, the slide 7, as well as the machine support 8 are identical in construction with the embodiment of FIG. 1, with the difference between the embodiments of FIGS. 1 and 4 residing in the construction of the guide plate 45 as well as the truncated conically shaped axle journal 46. More particularly, as shown in FIG. 5, the axle journal 46 is threadably secured to the guide plate 45 by a centrally disposed axially extending bolt or screw 47, with a nut 49 being threadably secured to an operating end 48 of the bolt or screw 47. The nut 49 is adapted to be rotated or operated by a wrench, turning tool, or a control lever 50 indicated in phantom line. A tightening or loosening of the nut or bolt 47 causes a fixing or loosening of the axle journal 46 in the pivot bearing 16. In order to provide enough space for enabling a loosening of the bolt 47, the guide plate 45 is provided with a lateral gap 51. By virtue of this arrangement, a fixing or loosening of the axle journal 46 is extremely simple because only one bolt or screw 47 needs to be handled. With a suitable screw pitch, the wrench, turning tool, or control lever 50 only need to be turned over a relatively short rotational distance in order to loosen or fix the axle journal 46. Fixing screws 52, 53 are only employed to adjust a suitable bearing backlash when the slide 7 is initially installed on the adjusting device 4 and no further adjustment is necessary during a fixing of the axle journal 46 for working operations. As can readily be appreciated, the construction for the axle journal 46 according to FIGS. 4 and 5 can also be applied to the axle journal 37 of the machine support 8. Likewise, a worm gear 38 and an adjusting worm 39 could also be applied to the axle journals 15 or 46 of the guide plates 6 or 45.

The technical possibilities of the work stand 1 or 44 in FIGS. 1 and 4 can be used especially in such a manner that the column 3 is installed in an area of an edge 54 of a rectangular of square base plate 2, with a distance A between a longitudinal center axis of the column 3 and a longitudinal center axis of the machine support 8 corresponds to about one-half of a length of an edge of the base plate 2.

Figure 6:
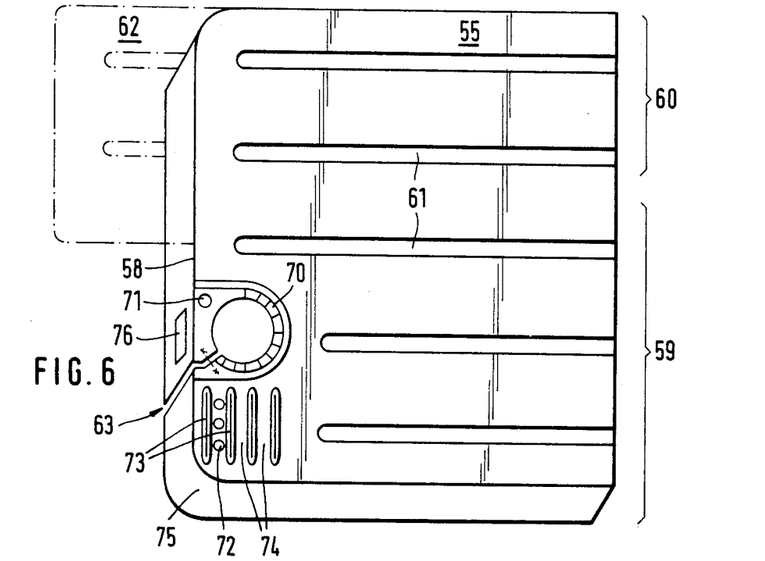
FIG. 6 is a top view of an embodiment of a base plate for a work stand constructed in accordance with the present invention.
Figure 7:
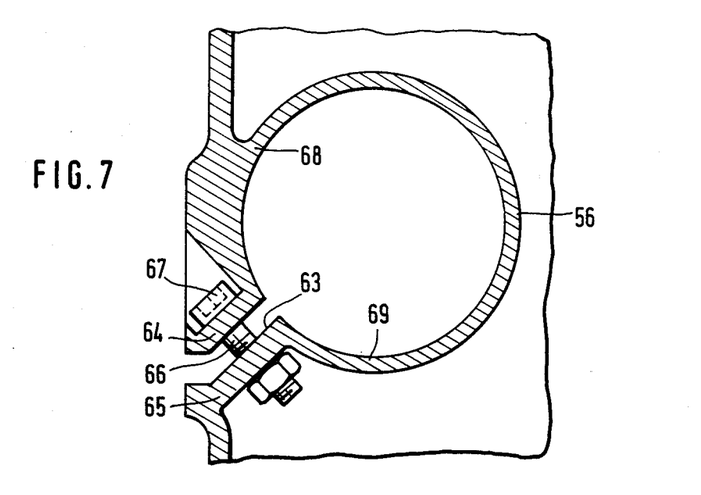
FIG. 7 is a cross-sectional view of a portion of the base plate of FIG. 6 within an area of the column.

As shown in FIGS. 6 and 7, a base plate for the work stand 1 or 44 may be formed as a cast base plate provided with a cast on sleeve 56 for enabling an attachment of the column 3, with the sleeve 56 being eccentrically arranged at a side ratio of about 2:1 along a back edge 58 of the base plate 55. The substantially square shaped base plate 55 includes a working surface 59 which extends forwardly to the column 3 and another working surface 60 which is located laterally and extends up to the column 3. The working surface 60 is provided with slots or openings 61 for accommodating clamping devices or the like for the work pieces. The working surface 60 makes it possible to shift a work piece during a milling operation orthogonally in respect to the back edge 58.

As shown in phantom line in FIG. 6, the secondary surface may extend beyond the back edge 58 of the base plate 55 thereby resulting in a base plate 62 provided with an angular configuration, with the column 3 being located at an inner angular edge of the base plate 62.

The sleeve 56 for accommodating the column 3 is provided with a vertically extending longitudinal slot generally designated by the reference numeral 63, with the sides of the slot 63 being defined by angular flanges 64, 65 adapted to be clamped by a bolt or screw 66 provided with a socket head 67 so that the columns 3 can be rotated by a tightening or loosening of the clamping jaws 68, 69 of the sleeve 56 during a working operation. The base plate 55 or 62 is provided with an opening for accommodating a scale member 70 surrounding the column 3. Moreover, the base plate 55 or 62 is provided with holes 71, 72 adjacent the column for accommodating sockets or keys and with convex web means 73 separated by grooves 74 which are adapted to prevent a drill or the like from rolling off the base plate when removed from the work stand.

While I have shown and described several embodiments in accordance with the present invention, it is understood that the same is not limited thereto but is susceptible of numerous changes and modifications known to one having ordinary skill in the art, and I therefore do not wish to be limited to the details shown and described herein but intend to cover all such modifications as are encompassed by the scope of the appended claims.

I claim:

1. A work stand for a power tool, the work stand comprising a base plate means, a guide column means mounted on said base plate means, supporting bracket means adjustably mounted on said guide column means, a guide plate means, means for mounting the guide plate means to the supporting bracket means so as to be pivotable about a horizontal axis including a first truncated conically shaped axle journal and a first conically shaped pivot bearing means interposed between the support bracket means and the guide plate means, a slide means for selectively displacing the power tool, a support means for accommodating the power tool, guide means interposed between the guide plate for guiding a translational movement of the slide means, and means for pivotally mounting the support means to the slide means so as to be pivotable about a horizontal axis including a second truncated conically shaped axle journal and a second conically shaped pivot bearing means interposed between the support means and the slide means.

2. A work stand according to claim 1, wherein said first conically shaped axle journal is secured to said guide plate means and said second conically shaped axle journal is secured to said support means, with said first and second conical pivot bearing means being respectively provided in said support bracket means and said slide means, and wherein each of said first and second conically shaped axle journals increase in an outward direction from the support bracket means and the slide means.

3. A work stand according to claim 2, wherein said guide means for guiding a movement of the slide means includes a prismatic guide member 4. A work stand according to claim 3, wherein the supporting bracket means includes a first and second housing part each including a conical shell portion defining said first conical pivot bearing means, said conical shell portion being adapted to surround the first conically shaped axle journal, means for releasably securing the first and second housing parts together, said slide means includes first and second housing parts each including conical shell portions defining said second conical pivot bearing means, said conical shell portions of the housing parts of the slide means being adapted to surround the second conically shaped axle journal, means for releasably securing the first and second housing parts of said slide means together, and wherein the housing parts of the supporting bracket means and the slide means are divided in the direction parallel to a center axis of the conically shaped pivot bearing means in a direction to motion of the supporting bracket means and the slide means.

5. A work stand according to claim 4, wherein the means for releasably securing the housing parts of the supporting bracket means and the slide means includes at least one fixing screw disposed in close proximity to the respective conical shell portions of the supporting bracket means and said slide means.

6. A work stand according to claim 5, wherein the second conically shaped axle journal includes a coaxially mounted worm gear, and an adjustable worm means is disposed in the slide means and cooperates with the worm gear means so as to enable an adjustment of the support means with respect to the slide means.

7. A work stand according to claim 6, wherein the column means is disposed along a back edge of the base plate means in such a manner that the base plate means defines two working surfaces, one of the working surfaces being disposed in front of the column means and the second working surface disposed laterally of the column means.

8. A work stand according to claim 7, wherein said base plate means has a substantially square configuration and the column means is eccentrically arranged at a side ratio of 2:1.

9. A work stand according to claim 7, wherein the base plate has an angular configuration with the column means disposed along an inner angular edge.

10. A work stand according to claim 9, wherein a distance between a longitudinal center axis of the column to a longitudinal center axis of the support means is equal to about one-half a length of a side of the base plate means.

11. A work stand according to claim 10, further comprising a cast on sleeve means provided in the base plate means for surrounding the column means, said sleeve means including a slot therein so as to form a pair of clamping jaws adapted to clamp an outer periphery of the column means, and means for selectively tightening the clamping jaw means so as to enable a rotational adjustment of the column means.

12. A work stand according to claim 10, wherein at least one opening is provided in the base plate means in an area near the column means for accommodating socket keys.

13. A work stand according to claim 12, further comprising at least one of grooves and web means provided in the base plate means in an area near the column means for preventing the power tool from rolling off the base plate means when the power tool is removed from the support means.

14. A work stand according to claim 2, wherein the first conically shaped axle journal is secured to said guide plate means by a centrally disposed axially extending bolt means, lateral access means are provided in the guide plate means for permitting one of a tool means and a handle means access to the bolt means so as to rotate the bolt means whereby the first conically shaped axle journal can be fixed or loosened from the first conical pivot bearing means.

15. A work stand according to claim 14, wherein the column means is disposed along a back edge of the base plate means in such a manner that the base plate means defines two working surfaces, one of the working surfaces being disposed in front of the column means and the second working surface disposed laterally of the column means.

16. A work stand according to claim 15, wherein said base plate means has a substantially square configuration and the column means is eccentrically arranged at a side ratio of 2:1.

17. A work stand according to claim 15, wherein the base plate has an angular configuration with the column means disposed along an inner angular edge.

18. A work stand according to claim 17, wherein a distance between a longitudinal center axis of the column to a longitudinal center axis of the support means is equal to about one-half a length of a side of the base plate means.

19. A work stand according to claim 17, further comprising a cast on sleeve means provided in the base plate means for surrounding the column means, said sleeve means including a slot therein so as to form a part of clamping jaws adapted to clamp an outer periphery of the column means, and means for selectively tightening the clamping jaw means so as to enable a rotational adjustment of the column means.

20. A work stand according to claim 1, wherein the supporting bracket means includes a first and second housing part each including a conical shell portion defining said first conical pivot bearing means, said concal shell portion being adapted to surround the first conically shaped axle journal, means for releasably securing the first and second housing parts together, said slide means includes first and second housing parts each including conical shell portions defining said second conical pivot bearing means, said conical shell portions of the housing parts of the slide means being adapted to surround the second conically shaped axle journal, means for releasably securing the first and second housing parts of said slide means together, and wherein the housing parts of the supporting bracket means and the slide means are divided in the direction parallel to a center axis of the conically shaped pivot bearing means in a direction of motion of the supporting bracket means and the slide means.

21. A work stand according to claim 20, wherein the means for releasably securing the housing parts of the supporting bracket means and the slide means includes at least one fixing screw disposed in close proximity to the respective conical shell portions of the supporting bracket means and said slide means.

22. A work stand according to claim 21, wherein the second conically shaped axle journal includes a coaxially mounted worm gear, and an adjustable worm means is disposed in the slide means and cooperates with the worm gear means so as to enable an adjustment of the support means with respect to the slide means.

23. A work stand according to claim 1, wherein the column means is disposed along a back edge of the base plate means in such a manner that the base plate means defines two working surfaces, one of the working surfaces being disposed in front of the column means and the second working surface disposed laterally of the column means.

24. A work stand according to claim 23, wherein the base plate has an angular configuration with the column means disposed along an inner angular edge.

25. A work stand according to claim 24, wherein a distance between a longitudinal center axis of the column to a longitudinal center axis of the support means is equal to about one-half a length of a side of the base plate means.

26. A work stand according to claim 23, further comprising a cast on sleeve means provided in the base plate means for surrounding the column means, said sleeve means including a slot therein so as to form a pair of clamping jaws adapted to clamp an outer periphery of the column means, and means for selectively tightening the clamping jaw means so as to enable a rotational adjustment of the column means.

27. A work stand according to claim 1, wherein a distance between a longitudinal center axis of the column to a longitudinal center axis of the support means is equal to about one-half a length of a side of the base plate means.

* * * * *